Aug. 9, 1927.
C. COTTA
1,638,149
TRANSMISSION CONTROL MECHANISM
Filed July 22, 1925    2 Sheets-Sheet 1
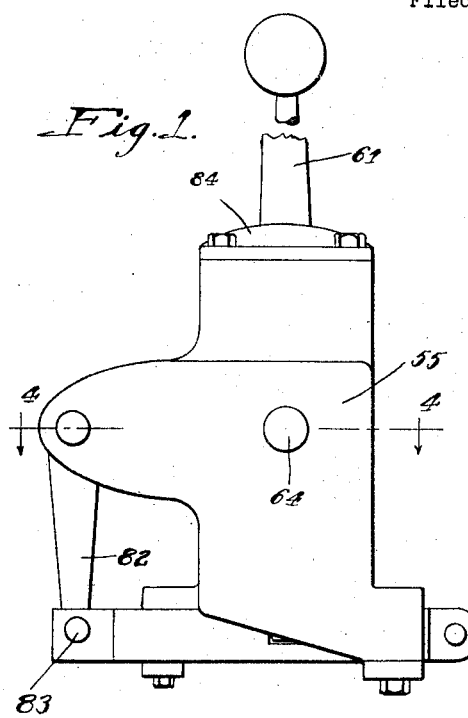
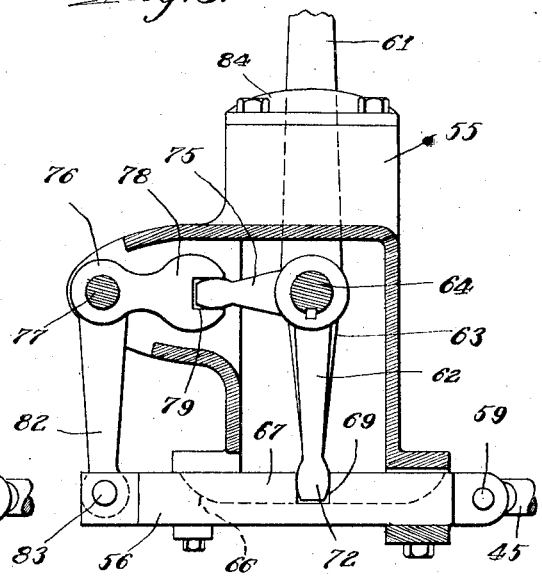
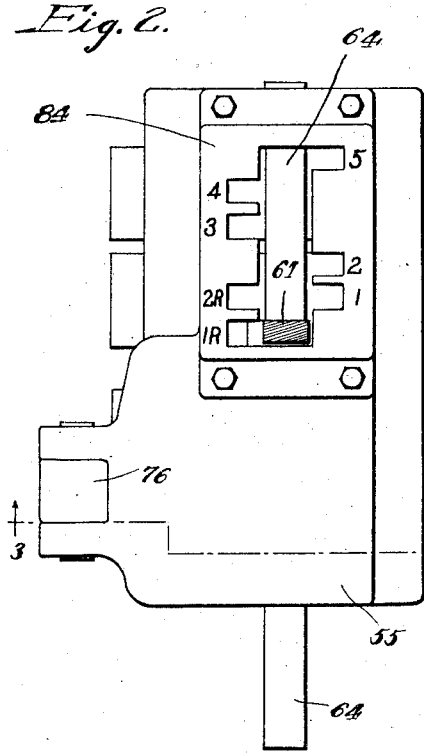
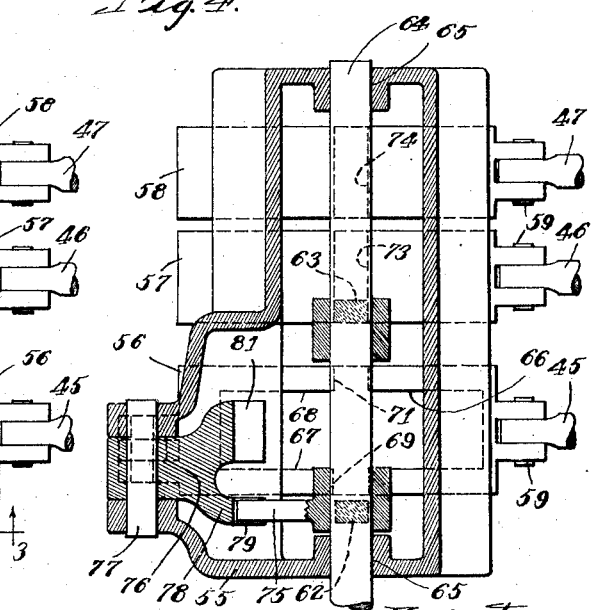
Inventor
Charles Cotta
By Wilson & McCann
Attys.

Aug. 9, 1927.
C. COTTA
1,638,149
TRANSMISSION CONTROL MECHANISM
Filed July 22, 1925   2 Sheets-Sheet 2
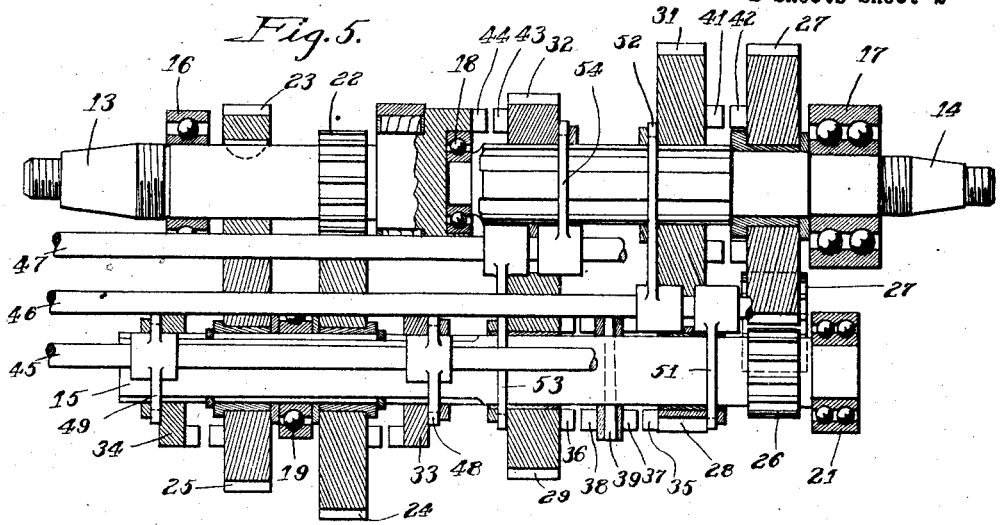
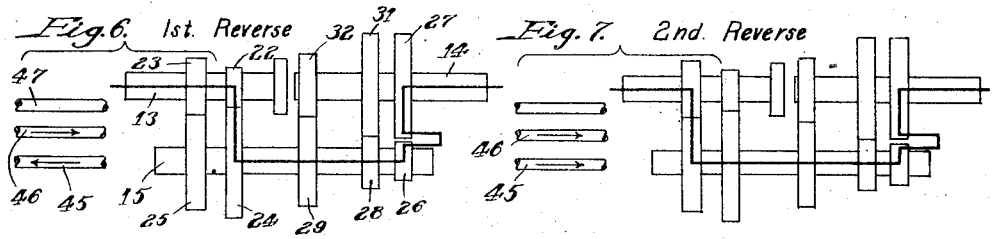
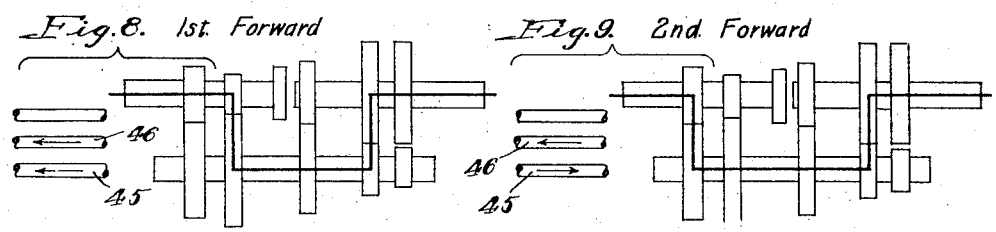
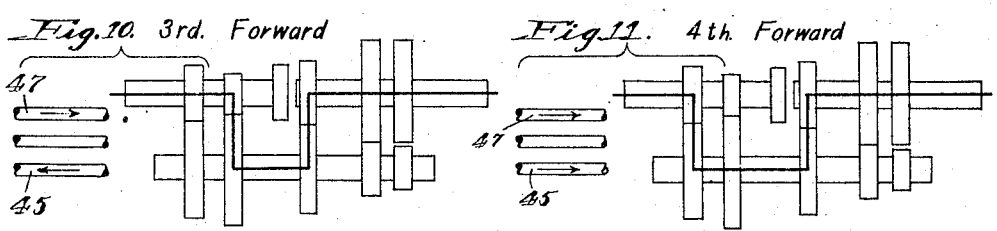
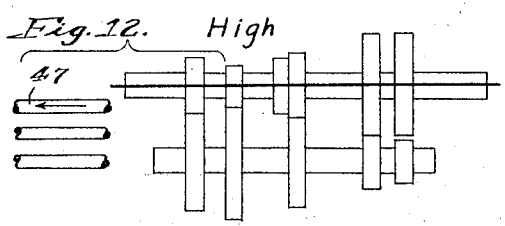
Inventor:
Charles Cotta
By Wilson & McCanna
Attys.

Patented Aug. 9, 1927.

1,638,149

UNITED STATES PATENT OFFICE.

CHARLES COTTA, OF ROCKFORD, ILLINOIS.

TRANSMISSION-CONTROL MECHANISM.

Application filed July 22, 1925. Serial No. 45,157.

This invention relates to change speed transmissions of the sliding gear or sliding clutch type especially adapted for use in motor driven vehicles but also adapted for use in any of the mechanical arts where it is desired to selectively transmit from a driving shaft any of a variety of speeds.

One of the chief objects of my invention is to provide a change speed gear transmission and a control mechanism therefor by which an unusually large range of speeds may be obtained by operation of a single control lever. This is especially desirable in connection with motor busses and trucks which handle heavy loads and require a larger range of propelling speeds than are needed with smaller or lighter vehicles. For this purpose it has been heretofore customary to provide either dual transmissions each having an independent control, or the so-called two range or multi-range transmissions having plural control levers. The present invention aims to provide control mechanism characterized by the use of a single control lever as above-mentioned for operating transmission mechanism of the kind referred to. This single lever control not only greatly simplifies the operation and control of a motor bus or the like but it makes for greater convenience and safety.

Another purpose of my invention is to provide mechanism of the kind described characterized by a single control lever which operates plural selectors in opposite directions in such order as to enable a comparatively wide range of gear shifting movements. In the present example I obtain with a single control lever five speeds forward and two speeds reverse, all of which are selective.

Still another purpose is to provide a simple and practical organization of parts for performing the functions referred to.

Other objects and attendant advantages will be appreciated by those skilled in this art as the invention becomes better understood by reference to the following description when considered in connection with the accompanying drawings, in which—

Figure 1, is a side elevation of a control embodying my invention.

Fig. 2, is a top view thereof with the control lever in section;

Fig. 3, is a vertical sectional view taken substantially on the line 3—3 of Fig. 2;

Fig. 4, is a horizontal section taken substantially on the line 4—4 of Fig. 1;

Fig. 5 is a vertical section through one embodiment of a gear transmission used in connection with my invention; and Figs. 6 to 12 inclusive, are diagrammatic views illustrating the different speed changes.

For purpose of clarity I will describe in order the construction shown of (1) the gear transmission, (2) the shifting mechanism, (3) control set, and (4) the operation.

Gear transmission.

Referring to Fig. 5, the gear transmission shown is, in some respects, of a conventional type characterized by a driving shaft 13, a driven shaft 14, a counter-shaft 15, and gearing and clutches adapted for connecting these shafts in such order as to secure the desired changes in speed and direction. Said shafts are suitably journaled in a transmission case (not shown), shaft 13 in a bearing 16, shaft 14 in a bearing 17, a pilot bearing 18 between shafts 13 and 14, and shaft 15 in bearings 19 and 21.

The driving shaft 13 has two fixed gears 22 and 23 of different diameter, which will be referred to as the low and high range drive gears respectively. These gears are constantly in mesh with gears 24 and 25 respectively, which revolve loosely on the counter-shaft and are held from axial shifting thereon. By connecting either one of the gears 24 or 25 to the counter-shaft by clutches, which will be later described, the counter-shaft may be driven at different speeds.

The counter-shaft has a fixed gear 26 which drives the gear 27, loose on the driven shaft, through the agency of a reverse idler gear 27' for effecting the reverse drive, as will be described later.

Gears 28 and 29 of relatively small and large diameter, loose on the counter-shaft, are in constant mesh with gears 31 and 32 respectively, splined on the driven shaft and adapted for transmitting variable speeds as will be presently described.

There are two clutch elements 33 and 34 splined or keyed so as to slide lengthwise upon and to rotate with the counter-shaft, each having clutch teeth adapted to connect and disconnect with complemental clutch teeth on the gears 24 and 25 respectively.

By the proper shifting of these clutch elements the counter-shaft may be driven at either a relatively low or a high speed, as will be obvious.

The gears 28 and 29 are equipped with clutch teeth 35 and 36 respectively adapted to connect and disconnect by shifting of said gears on the counter-shaft with complemental clutch teeth 37 and 38 respectively on a clutch element 39 keyed or otherwise secured to the counter-shaft. By the proper shifting of said gears 28 and 29, either may be connected to the counter-shaft, as will be obvious, so as to drive its complemental gear 31 or 32. Gear 31 has clutch teeth 41 adapted to engage complemental clutch teeth 42 on the gear 27; and gear 32 has clutch teeth 43 adapted to engage complemental clutch teeth 44 on the driving shaft 13. By proper shifting of the gears 31 and 32 the gear 31 may be connected to the gear 27 while still in mesh with the gear 28 to produce an intermediate speed, and the gear 32 while still in mesh with the gear 29 may connect the driving and driven shafts that produce the direct drive.

Shifting mechanism.

There are three shift bars, 45, 46 and 47 for shifting the gears and clutch elements above-described, the shift bars being preferably arranged in parallelism in a common plane. Shift bar 45 has fixed thereto forks 48 and 49, which engage the clutch elements 33 and 34 respectively for shifting them on the counter-shaft. Shift bar 46 has fixed thereto forks 51 and 52 which engage the gears 28 and 31 respectively for shifting them on their respective shafts. Shift bar 47 is equipped with forks 53 and 54 which engage the gears 29 and 32 respectively for shifting them on their respective shafts. It will be observed that the shift forks are so arranged on the shift bars that each bar will perform a disconnecting and a connecting function when shifted in each direction, assuming, of course, that the bar is moved from an operative position as distinguished from the neutral position in which it is shown in Fig. 5. This and the peculiar arrangement of the shift forks are for the purpose of securing a determined number of changes in speed and direction, which will be presently described.

By moving the shift bar 45 to the left, gear 24 will be connected to the counter-shaft to drive the latter at the low speed; and by moving shift bar 46 to the right, gear 31 will be connected to gear 27 to drive the driven shaft through the reverse idler and thus produce low or first reverse. The course of power transmission resulting from this operation of the shift bars 45 and 46 is shown diagrammatically by the heavy line in Fig. 6. By moving both shift bars 45 and 46 to the right, gear 25 will be connected to the counter-shaft to drive the latter at the higher speed and gear 31 will be connected to gear 27 as in the former case, thus producing the high speed reverse, or second reverse, as shown diagrammatically in Fig. 7.

The first speed forward is obtained by moving both shift bars 45 and 46 to the left to drive the counter-shaft through the low range gear 24, as above described, and to connect the gear 28 to the counter-shaft through the agency of the clutch element 39 to drive the driven shaft 14 through gears 28 and 31, as shown diametrically in Fig. 8. The second speed forward is obtained without changing the position of the shift bar 46 but by reversing the position of the shift bar 45, as shown in Fig. 9, which drives the counter-shaft at the higher speed. The third speed forward is obtained by moving the shift bar 45 to the left and the shift bar 47 to the right, as shown in Fig. 10, to drive the counter-shaft through the low range gears and to move the gear 29 into connection with the clutch element 39 on the counter-shaft so as to drive the driven shaft 14 through the gears 29 and 32. To obtain the fourth speed forward the shift bar 47 remains the same as in the third speed position and the shift bar 45 is moved to the right to drive the counter-shaft at the higher speed, as indicated in Fig. 11. The fifth or high speed forward is produced with the shift bars 45 and 46 in neutral position, by moving the shift bar 47 to the left to connect the clutch teeth 43 and 44, as illustrated in Fig. 12.

Control.

The control, or control set as it is sometimes termed, is shown in Figs. 1 to 4 inclusive and its function is to operate the shift bars in the manner above described to produce the five speeds forward and two reverse, the salient feature of the present control being that this is accomplished by operation of a single control or hand lever.

The control is supported in a housing designated generally by 55 which may be located in suitable relation to the transmission casing. In the base portion of this housing are mounted three slides 56, 57 and 58, in a common plane and in parallel relation, the shape of these slides being as shown in Figs. 3 and 4. These slides are suitably connected as at 59 to the shift bars 45, 46 and 47 respectively, for the purpose of shifting said bars lengthwise to perform the gear and clutch shifting operations above-described.

The means for shifting the slides comprises, generally stated, a control lever 61, a first and a second selector 62 and 63 respectively, directly operated by the control lever, and a reversing connection between the control lever and the slide 56 which will be presently described. In the present embodiment of my invention the control lever is fixed to a shaft 64 which is suitably mounted in bearings 65 in the housing 55 with capacity to be oscillated and shifted lengthwise therein by manual operation of said lever. The selectors 62 and 63 are fixed to the shaft 64 in the spaced relation shown in Fig. 4 and depend from the shaft in the same radial plane as shown in Fig. 3. Each selector is simply in the form of a lever arm the lower end of which is adapted to engage in a slot in one of the shift bar slides for moving the latter back and forth in its horizontal plane by forward and backward movement of the control lever, that is, by rocking the shaft 64. Said selectors are adapted to be moved into and out of the slots in the shift bar slides by lengthwise movement of the shaft 64 produced by lateral pressure on the control lever 61. The selector 62 is adapted to connect with the slide 56 at either of two lengthwise shifted positions of the shaft 64. To this end the top of the slide 56 is recessed or grooved as at 66, defined by dotted lines in Fig. 3 and by both dotted and full lines in Fig. 4. The side walls 67 and 68 of said slide are then transversely slotted at 69 and 79 for reception of the end 72 of the selector 62. Each slide 57 and 58 is transversely slotted entirely across as at 73 and 74 respectively, for reception of a similar end on the selector 63. The slide reversing connection referred to, and best shown in Figs. 3 and 4, comprises an arm 75 fixed to the shaft 64, in this case in the same plane and at right angles to the selector 62, and a bell crank lever 76 pivoted on the housing 55 at 77, one of its arms 78 having two aligned but separated bifurcated portions having slots 79 and 81 for reception of the arm 75, and the other arm 82 being pivotally connected at 83 to the slide 56. Viewing Fig. 4, it will be observed that the slots 79 and 81 in the arm 78 are located in different vertical planes taken transversely of the shaft 64 so as to be out of registration to allow the arm 75 to register with said slots 79 and 81 at times when the selector 62 is out of the operative relation to the slots 69 and 71. The purpose of this is to shift the slide 56 either by the selector 62 when it is positioned in either the slot 69 or 71, or by the reversing connection just described when the arm 75 is moved into either the slot 79 or 81, as determined by shifting the shaft 64 lengthwise by manipulation of the control lever.

As a guide for the control lever and to determine the respective shifted positions thereof for the different speeds I have provided a cover plate 84 slotted as shown in Fig. 2. These slots permit movement of the control lever either forward or backward at the different lateral positions to produce speed changes and in one position the control lever may be shifted either forward or back to produce two changes. Suitable indicia are cast or impressed on the cover plate opposite said slots to designate the different changes, consisting at present of "1 R" meaning first reverse, "2 R" meaning second reverse, "1" meaning the first speed forward, and "2", "3", "4" and "5" designating the additional forward speeds.

Operation.

As shown in the drawings, the parts are in a neutral position and suitable means such as spring-pressed detents (not shown) or equivalent means, well known in this art, may be employed for preventing accidental displacement of the control lever or any of the shift bars from this or any shifted position. To produce the first reverse speed the operator will swing the control lever 61 forward, that is, in a counter-clockwise direction, viewing Fig. 1, so as to move it into the slot "1 R." In this position the first selector 62 performs no function because it is out of the slot 69, but the second selector 63 located in the slot 73 will move the slide 57 backward and the arm 75, which is located in the slot 79, will actuate the bell-crank lever 76 to move the slide 56 forward. This moves the shift rods 45 and 46 in opposite directions and produces the first reverse speed, shown in Fig. 6, as described above. After the control lever has been returned to neutral it may be shifted laterally into alignment with the adjacent cover plate slots and may be shifted either forward into the "2 R" slot or backward into the "1" slot. In this position of the control lever its first selector 62 is located in the slot 69 and its second selector 63 in the slot 73; consequently when said control lever is swung forward both shift bars 45 and 46 will be moved in the same direction, that is, backward or to the right, as shown in Fig. 7, to produce the second reverse speed, and when swung backward both of said rods will be moved forward or to the left, as shown in Fig. 8, to produce the first forward speed. In this position the arm 75 merely swings idly between the slots 79 and 81 in the bell-crank lever 76. The next lateral shifting of the control lever will bring it into alignment with the "2" slot in the cover plate which brings the arm 75 into the slot 81 of the reversing connection and leaves the second selector 63 in the slot 73 so that when the control lever is swung rearward the shift bars 45 and 46 will be moved in opposite directions to produce the second forward speed, as shown in Fig. 9. The next lateral shift of the control lever will bring it into alignment with the "3" slot in the cover plate, which leaves the arm 79 in the slot 81 and moves the second selector 63 into the slot 74 of the slide 58. Thus, upon swinging the control lever forward the shift bars 45 and 47 will be moved in opposite directions to produce the third forward speed, shown in Fig. 10. In the fourth forward speed the first selector 62 is moved into the slot 71 in the slide 56 and the second selector 63 remains in the slot 74 so that when the control lever is swung forward the shift bars 45 and 47 will be moved rearward to produce the fourth forward speed. The fifth forward speed or direct, is produced simply by moving the control lever laterally to the last position in which only the slide 58 is shifted by the second selector 63 engaging in the slot 74, in which position both the first selector 62 and the reversing connector arm 75 do not function.

It is believed that the foregoing conveys a clear understanding of the objects prefaced above and while I have illustrated but a single working embodiment it should be understood that changes might be made in the construction and arrangement of parts without departing from the spirit and scope of the invention as expressed in the appended claims, in which—

I claim:

1. Control mechanism for transmissions comprising, in combination, three shift bars, a single control lever, and means operated by said control lever for simultaneously moving plural shift bars back and forth in the same direction or for simultaneously moving them in opposite directions.

2. In combination, a change-speed gear transmission having shiftable gears or clutches adapted to produce two reverse speeds and five forward speeds, shifting mechanism for effecting said speeds including three shifter bars, and a control having a single control lever for operating said bars, one separately or more than one simultaneously in either direction or opposite directions.

3. A control for change-speed transmissions comprising shiftable speed changing elements, a single manually operable control lever, and means operated thereby, including a direct motion-transmitting connection between said lever and elements and a reversing motion-transmitting connection between said parts for effecting the speed changes.

4. A control for change-speed transmissions comprising shiftable speed changing elements, a single control lever, and means operated thereby intermediate said lever and said elements to connect the same for effecting the speed changes, including a direct motion-transmitting connection and a reversing motion-transmitting connection.

5. A control for change-speed transmissions comprising plural shiftable speed changing elements, a single control lever, and means operated thereby for effecting the speed changes by shifting said elements including plural direct motion-transmitting connections adapted to be operated at each operation of said lever and a reverse motion-transmitting connection adapted to be operated at intermittent operations of said lever.

6. In combination, a change-speed gear transmission having shiftable gears or clutches adapted for transmitting two reverse speeds and three or more forward speeds, shifting mechanism for producing said speeds, and a control for said shifting mechanism comprising a plurality of speed changing elements, a single control lever, and direct and reversing motion-transmitting connections between said lever and said elements to be operated thereby.

7. The combination of a change-speed transmission having shiftable gears or clutches adapted for producing a low and a high range of speed changes; shifting mechanism for effecting said changes including three shift bars adapted to shift said gears or clutches; and a control for moving said shift bars comprising a slide connected to each shift bar, a single control lever, and a first and a second selector connected with said lever and adapted to be moved thereby into and out of operative relation with said slides and for moving the slides by operation of the control lever.

8. The combination of a change-speed transmission having shiftable gears or clutches adapted for producing a low and a high range of speed changes; shifting mechanism for effecting said changes including three shift bars adapted to shift said gears or clutches; and a control for moving said shift bars comprising a slide connected to each shift bar, a single control lever, a first and a second selector connected with said lever and adapted to be moved thereby into and out of operative relation with said slides and for moving the slides by operation of the control lever, and a reversing motion-transmitting connection adapted to be operated by said control lever for moving one of said slides when the first selector is out of operative relation therewith.

9. The combination of a change-speed transmission having shiftable gears or clutches adapted for producing a low and a high range of speed changes; shifting mechanism for effecting said changes including three shift bars adapted to shift said gears or clutches; and a control for moving said shift bars comprising a shaft mounted to oscillate and to be moved lengthwise, a single control lever on said shaft for imparting either of said movements, a first and a second selector arm fixed to said shaft, the first selector arm being adapted to operatively engage one of said slides at different laterally shifted positions of said shaft and the second selector arm adapted for engaging either of the remaining slides at different positions of said shaft, and a reversing motion-transmitting connection for moving the first-mentioned slide including a part fixed to said shaft and adapted for making and breaking said connection at different lateral positions thereof.

10. In combination, a change-speed transmission having shiftable gears or clutches adapted for transmitting a low and a high range of forward and reverse speeds, shifting mechanism having three shift rods for producing said changes, and a control for operating said shift rods comprising a single control lever, a first and a second selector directly operated by said lever for selective connection with said shift bars, and a reversing motion-transmitting connection between the control lever and one of said shift bars.

11. Control mechanism comprising, in combination, three shift bars, a single control lever, a first and a second selector directly operated by said control lever for seletive connection with said shift bars, and a reversing motion-transmitting connection between said lever and one of said shift bars.

12. Control mechanism comprising, in combination, three shift bars, a single control lever, a first and a second selector directly operated by said control lever for selective connection with said shift bars, and a reversing motion-transmitting connection between said lever and one of said shift bars, said reversing motion-transmitting connection being rendered intermittently operative and inoperative in determined relation with the selective engagement of the first selector.

13. A control mechanism comprising, in combination, a plurality of shift bars, a single control lever, a plurality of selectors directly operated by the control lever for selective connection with said shift bars, and a reversing motion-transmitting connection adapted for intermittent operations by said control lever for operating one of said shift bars.

14. A control mechanism comprising, in combination, a plurality of shift bars, a single control lever, a plurality of selectors directly operated by the control lever for selectively moving said shift bars, one of said selectors being rendered operative and inoperative at different shifting operations of the control lever, and a reversing motion-transmitting connection between the control lever and one of the shift bars rendered operative and inoperative in determined relation with the operative and inoperative position of said selector.

15. A control mechanism comprising, in combination, a plurality of shift bars, a single control lever, selector means directly operated by the control lever for selective connection with said shift bars, and a reversing motion-transmitting connection operated by the control lever for moving one of the shift bars simultaneously with and in a direction opposite from that of another shift bar operated by one of said selectors.

16. In a control mechanism for change speed transmissions, the combination with a transmission comprising driving, driven and counter shafts, a plurality of pairs of change speed gears connecting the driven and counter shafts, and two pairs of gears of relatively high and low ratio connecting the driving and counter shafts, of means for selectively rendering operative any pair of the change speed gears in combination with either the relatively high or relatively low gear ratio pair, said means comprising a plurality of shift rods operatively associated with said gears, a single operating lever, selective direct motion transmitting connections between said lever and the shift rods for the change speed gears, and selective direct and reversing motion transmitting connections between said lever and at least one of said rods associated with the high and low ratio gear pairs.

17. In a control mechanism for change speed transmissions, the combination with a transmission comprising driving, driven and counter shafts, a plurality of pairs of change speed gears connecting the driven and counter shafts, and two pairs of gears of relatively high and low ratio connecting the driving and counter shafts, of means for selectively rendering operative any pair of the change speed gears in combination with either the relatively high or relatively low gear ratio pair, said means comprising a plurality of shift rods operatively associated with said gears, and simultaneously movable in pairs in like or opposite directions, one of said rods being associated with the high and low ratio gear pairs and the others being associated with the change speed gears, a single operating lever, selective direct motion transmitting connections between said lever and the shift rods associated with the change speed gears, and selective direct and reversing motion transmitting connections between said lever and the shift rod for the high and low ratio gear pairs.

In witness of the foregoing I affix my signature.

CHARLES COTTA.